United States Patent [19]

Loeber

[11] Patent Number: 4,749,065
[45] Date of Patent: Jun. 7, 1988

[54] DISC BRAKE RETAINER
[75] Inventor: Frederick W. Loeber, Tulsa, Okla.
[73] Assignee: Unit Rig & Equipment Co., Tulsa, Okla.
[21] Appl. No.: 2,277
[22] Filed: Jan. 12, 1987
[51] Int. Cl.[4] .................................. F16D 65/12
[52] U.S. Cl. .................... 188/18 A; 188/206 R; 188/218 X L
[58] Field of Search ............ 180/10; 188/18 A, 71.1, 188/73.1, 73.36, 73.37, 73.38, 206 R, 218 X L

[56] References Cited
U.S. PATENT DOCUMENTS
3,642,101  2/1972  Hauth ........................... 188/73.38
4,282,952  8/1981  Bartley ......................... 188/18 A Primary Examiner—Duane A. Reger
Attorney, Agent, or Firm—Head & Johnson

[57] ABSTRACT

A brake system for large off-road vehicles in which the vehicle has a central, non-rotating housing for each wheel supported to and forming a part of the vehicle structure, an outer rotatable wheel section including an outer hub and wheel rim rotatably supported to the housing, an annular brake disc, a caliper supported to the non-rotating housing having pads to contact the annular brake disc, the brake disc being secured at its outer perimeter to the wheel section in a manner permitting free radial expansion and minimal rotational displacement of the brake disc relative to the wheel section.

9 Claims, 4 Drawing Sheets

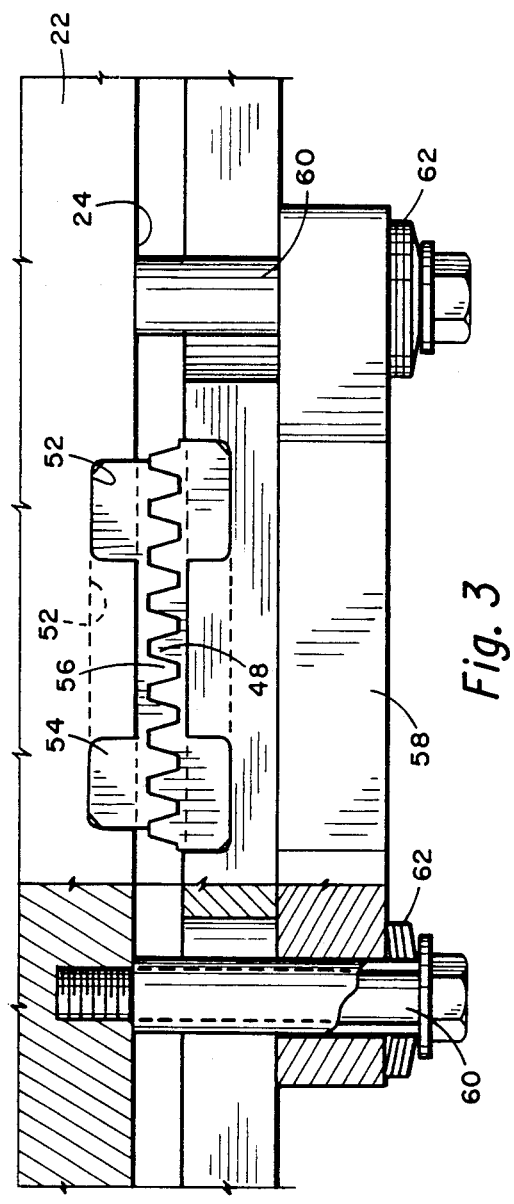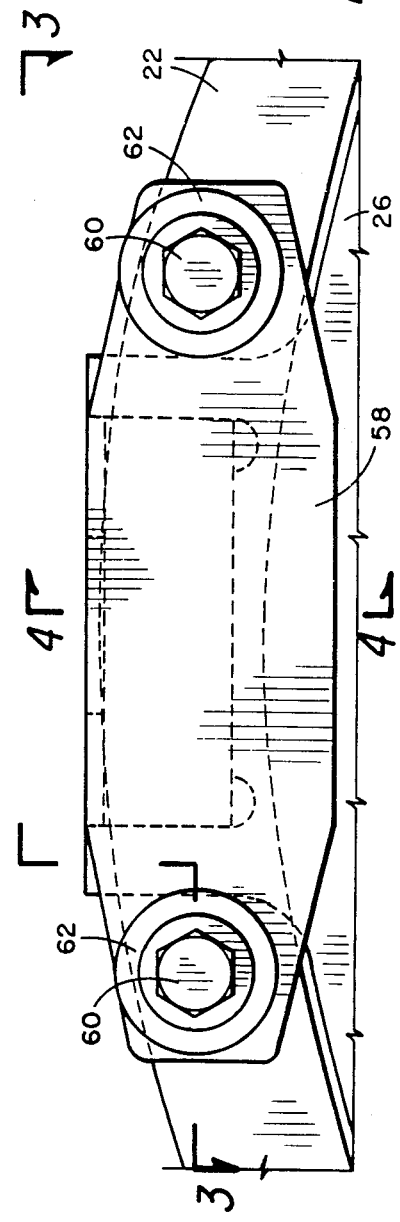

DISC BRAKE RETAINER

SUMMARY OF THE INVENTION

Large off-road vehicles such as those used for transporting heavy loads of earth in earth moving operations or ore in mining operations must have good braking ability to stop the vehicle with the heavy loads customarily transported. Further, because of the extreme heavy loads the great amount of kinetic energy which is generated when such loads are moving at a high rate of speed causes the brake systems to generate a large amount of heat. One type of brake system which has proven effective is the caliper brake utilizing an annular disc. Unlike a disc typically employed on smaller vehicles, such as automobiles, which the calipers extend over the outer circumferential periphery of the disc, the brake system utilizing annular discs employ calipers which extend across the inner circumference of the annular disc. Such discs are retained to the wheel of the vehicle on their outer peripheries. Because of the large amount of heat generated, the discs expand radially when heated and contract radially as they cool.

Others have provided brake systems for large off-road vehicles utilizing annular discs and for background information reference may be had to the following U.S. Pat. Nos.: 2,849,087, 2,905,279, 3,530,960, 3,630,320, 3,729,067, 4,282,952 and 4,330,045.

Of direct relevance to the present invention are U.S. Pat. Nos. 3,115,204, 4,282,952 and 4,330,045.

The present invention is directed towards an annular brake system as shown in the last two mentioned patents wherein the method for supporting the annular disc is improved in a manner permitting the disc to unrestrictedly expand and contract radially as the disc heats and cools during operation of the vehicle. The invention is directed to a system for a large off-road vehicle in which the vehicle has, for each wheel, a central non-rotatable housing supported to and forming a part of the vehicle. An outer wheel section, including a hub and wheel rim, is rotatably supported to the housing with the wheel section rotating about a wheel axis. An annular brake disc having an annular axis is utilized.

A caliper system is supported to the non-rotatable housing having brake pads contacting the opposed planar surfaces of the annular brake disc, the caliper extending across the interior circumferential surface of the annular brake disc.

The annular disc has a plurality (such as four) integral tang portions extending from the disc outer circumferential surface. Received within each of these tang portions is a disc rack insert, that is, a portion of an annular gear cut to fit in the recess, the rack portion having a plurality of spaced apart teeth, the teeth being in planes of the disc annular axis. An adapter ring is secured to the wheel section and has recesses therein which in like manner receive short rack inserts having spaced apart teeth which are in planes of the wheel rotational axis. A retainer bar is bolted to the adapter ring, the bar extending across the tang portions of the annular disc so that the adapter ring rack insert teeth mesh with the disc rack insert teeth.

This arrangement permits the annular disc to expand and contract as necessary, the teeth secured to the disc sliding relative to the teeth secured to the adapter ring while nevertheless the disc is supported in a way to permit little, if any, rotational displacement.

A better understanding of the invention will be had with reference to the following description and claims, taken in conjunction with the attached drawing.

DESCRIPTION OF THE DRAWING

FIG. 2 is an enlarged fragmentary elevational view taken along the line 2—2 of FIG. 1 showing a portion of the brake adapter ring.

FIG. 3 is an exterior view taken along the line 3—3 of FIG. 2, and shown partly in cross-section, of the sytem for retaining the annular brake disc.

DESCRIPTION OF THE PREFERRED EMBODIMENTS

Figure 1:
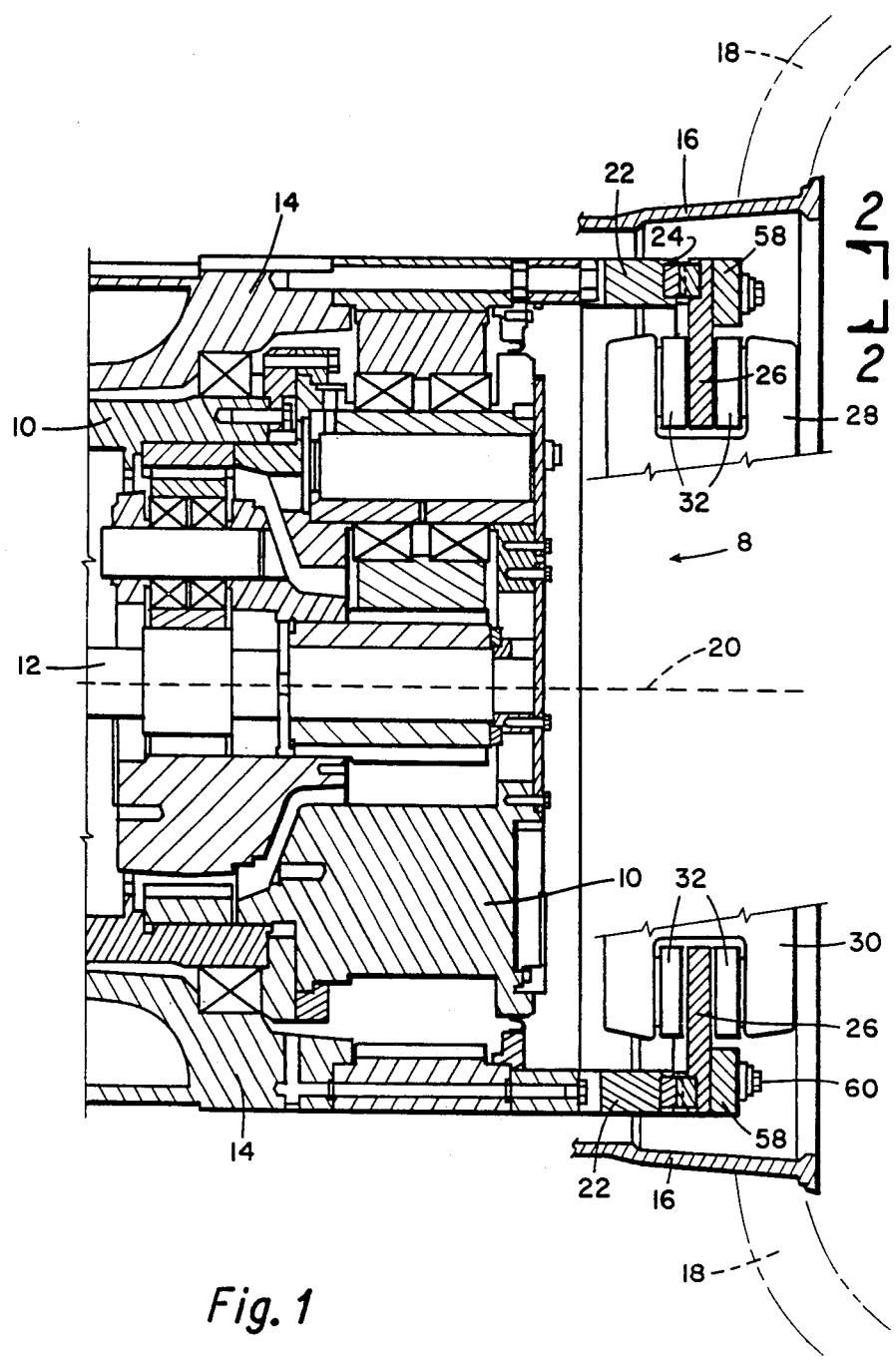
FIG. 1 is an elevational cross-sectional view of a vehicle housing portion supporting a wheel section including a hub and rim, and employing the improved brake system of the invention.

Referring to the drawings and first to FIG. 1 the environment in which the improved brake system of this invention is employed is illustrated by means of a cross-sectional view of the housing section by which a hub and wheel rim is rotatably supported to a large off-road vehicle. The housing section includes a stationary portion 10 which receives a shaft 12 from a power source. In some instances the shaft 12 will be driven directly from an internal combustion engine and in another arrangement the shaft 12 is driven by an electric motor. Rotational energy from the shaft 12 is reduced by two planetary gear systems which are illustrated in the drawing but which will not be described in detail since they are well known to practitioners in the art and are not directly related to the improvements which constitute the invention. Suffice it to say the two planetary gear systems reduce the rotational speed of shaft 12 to drive the vehicle wheel 14 which in turn supports a hub 16, the hub providing means for receiving a tire, only a portion of which is illustrated in dotted outline and identified by numeral 18. Wheel 14 rotates about a wheel axis 20.

Affixed to the wheel is an adapter ring 22, the adapter ring being generally tubular and rotating about the wheel axis 20. The adapter ring has an outer planar face 24 which is in a plane perpendicular the wheel axis 20.

Supported to the adapter ring 22 is an annular brake disc 26. Mounted to the housing 10 so as to be supported in a non-rotatable arrangement are opposed brake calipers 28 and 30. The means of supporting the brake calipers 28 and 30 to the housing stationary portion 10 is not illustrated since this is well known to practitioners in the art and is not directly related with the essence of the invention. The brake calipers 28 and 30 have opposed brake pads 32. To apply braking action the calipers, by hydraulic means, force the pads 32 against the opposed planar sides of the annular brake disc 26. When this happens the kinetic energy of the vehicle is substantially converted to heat in the braking system, and therefore, the annular brake disc 26 tends to rapidly heat and cool as the brakes are applied and released. This heating and cooling causes the annular brake disc 26 to expand and contract. it is the method of securing the brake disc 26 to the adapter ring 22 to freely permit such expansion and contraction, but while nevertheless limiting rotational displacement of the disc relative to the adapter ring, which is the subject of the invention and which will be better understood by reference to FIGS. 2 through 6.

Figure 6:
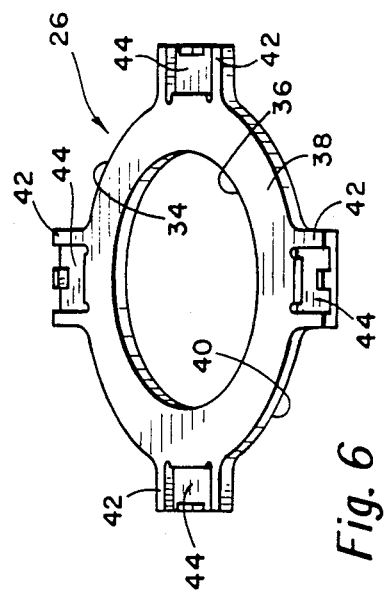
FIG. 6 is a reduced scale isometric view of the brake disc as employed in the invention.

FIG. 6 shows the annular brake disc 26 in a preferred embodiment. The disc has an external circumferential surface 34 and an internal circumferential surface 36. The disc has opposed planar surface 38 and 40 which are in planes perpendicular the wheel rotational axis 20.

Integrally extending from the disc 26 are a plurality (four are shown) of tang portions 42. Formed in each of the tang portions 42 is a recess 44. The details of a preferred arrangement of the recess 44 are shown in FIG. 5, it being understood that the particular configuration of the recess may vary and while the recess 44 shown in FIGS. 4, 5 and 6 is of depth less than the thickness of the disc, it can be seen that the recess 44 may be of the full thickness, that is, an opening formed through tang portion 42.

Received in recess 44 in each of the tang portions is a disc rack insert 46. Each disc rack insert 46 has spaced apart teeth 48 on one surface, the opposed or back surface 50 being planar and the external dimensions of the insert being such as to be snuggly, but slidably received within recess 44 to permit easy installation. The disc rack insert 46 can conveniently be manufactured by cutting the insert from a commercially available rack gear. the teeth 48 are in radial planes of the annular axis of the brake disc, the annular axis being coincident with the wheel axis 20 as shown in FIG. 1.

Figure 4:
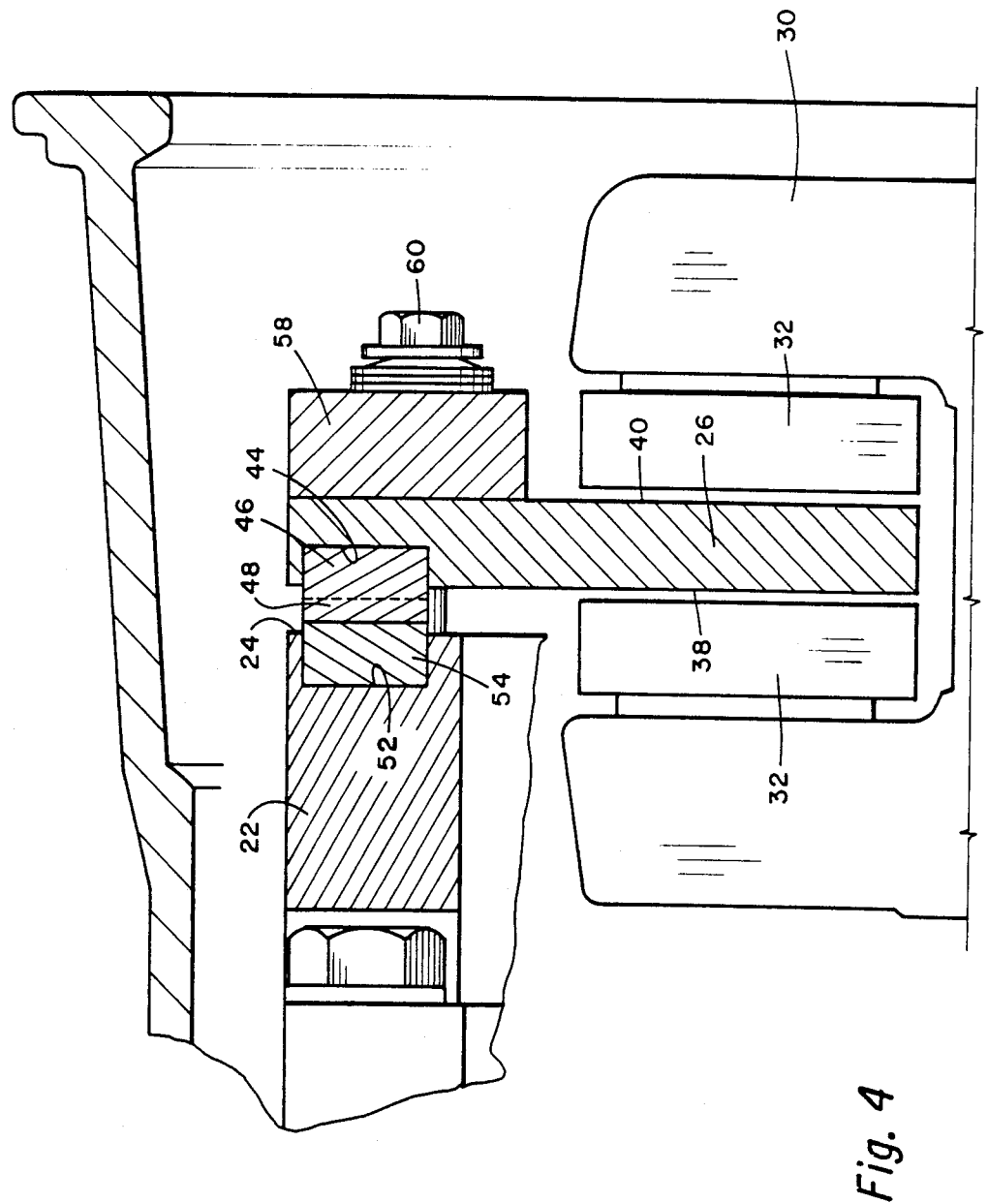
FIG. 4 is an enlarged cross-sectional view taken along the line 4—4 of FIG. 2 showing more details of the annular brake disc retention system.
Figure 5:
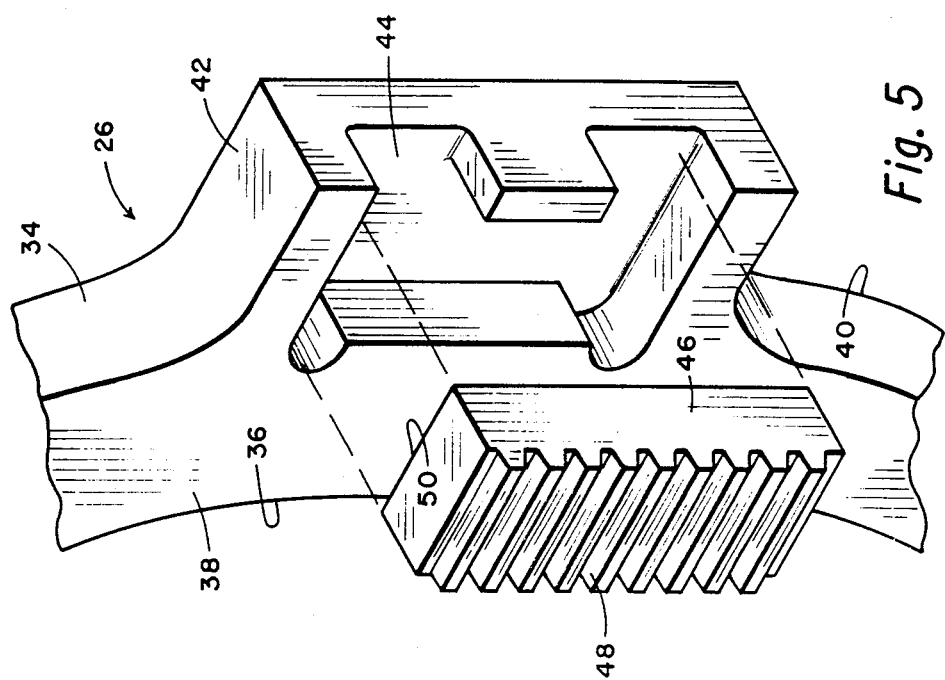
FIG. 5 is an enlarged fragmentary isometric view of the annular brake disc and the disc rack insert shown telescopically as to illustrate the manner in which it is positioned within a recess formed in the integral brake disc tang portion.

Formed in the outer planar face 24 of adapter ring 22, as best shown in FIGS. 3 and 4, are a plurality of recesses 52, the recesses being the same in number as the number of tangs on the annular brake disc 26, and the recesses are in register with the recesses 44 on the brake disc. Each recess 52 receives a retainer rack insert 54, the insert being dimensioned to be slidably received in the recess in the same manner that the disc rack insert 46 is recieved in recesses 44 of the annular brake disc. In the preferred arrangement the disc rack inserts 46 and the retainer rack inserts 54 may be cut from the same commercially available rack gear. Teeth 56 mesh with teeth 48 of the disc rack insert.

To retain the rack inserts of the disc and retainer ring in slidable contact with each other, a rack retainer bar 58 is secured to the adapter ring 22 by bolts 60. To provide a resilient biasing force between the teeth of the retainer racks 46 and 54, spring washers 62 are positioned between the heads of the bolts 60 and the retainer bar 58. By properly tightening the bolts 60 the compressive force urging the teeth of the retainer racks into engagement with each other is controlled.

It can be seen that the teeth 48 and 56 on the retainer racks allow the annular brake disc 26 to expand and contract radially while at the same time the brake disc is secured in non-rotatable relationship relative to wheel 14.

Figure 7:
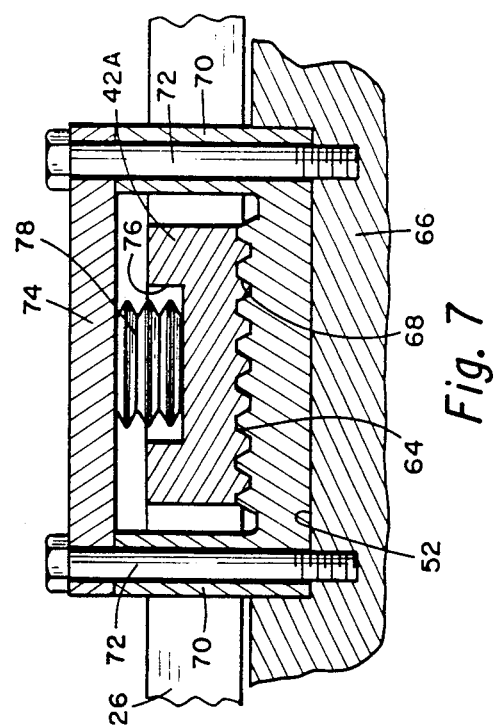
FIG. 7 is a cross-sectional view of an alternate embodiment of the invention showing an additional way in which the invention may be practiced.

FIG. 7 shows an alternate embodiment of the invention. In this embodiment, which is merely exemplary of the fact that the principle of the invention may be practiced in a variety of ways, teeth 64 are formed directly on the integral tang portion 42A. The recess 52 and the adapter ring 22 receives a rack member 66 which has teeth 68 meshing with the teeth 64 of the disc brake tang portion. In this embodiment the rack member 66 has upstanding portions 70 which receive bolts 72 to support a retainer bar 74. The disc tang portion 42A has a recess 76 in it and a stack of spring washers 78 extending between the retainer bar 74 and the disc tang portion 42A to force the teeth 64 and 68 into sliding engagement with each other.

It can understood that the embodiment of FIG. 7 functions in the same way as that described with reference to the embodiment of FIGS. 2 through 6, however, the advantage of the embodiments of FIGS. 2 through 6 is that readily available commercial rack gear segments may be easily fabricated whereas the embodiment of FIG. 7 requires the machining of teeth into the tang portions of the disc and the construction of a special rack member 66. As previously indicated, FIG. 7 is merely exemplary of the fact that the invention can be practiced in other ways, but the prefered embodiment is that in FIGS. 2 through 6.

The claims in the specification describe the invention presented and the terms that are employed in the claims draw their meaning from the use of such terms in the specification. The same terms employed in the prior art may be broader in meaning then specifically employed herein. Whenever there is a question between the broader definition of such terms used in the prior art and the more specific use of the terms herein, the more specific meaning is meant.

While the invention has been described with a certain degree of particularlity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A brake sytem for a vehicle, comprising:
    a central, non-rotatable housing supported to and forming a part of a vehicle;
    an outer rotatable wheel section, including an outer hub and wheel rim, rotatably supported to said housing and rotatable about a wheel axis;
    an annular brake disc having an annular axis;
    caliper means supported to said non-rotatable housing having means to contact said annular brake disc; and
    means providing meshed teeth relationship between said brake disc and said housing, the meshed teeth extending in planes radial of the axis of rotation of said wheel section providing means for non-rotatably securing said brake disc to said wheel section in a plane perpendicular to said wheel axis and permitting free radial expansion and minimal rotational displacement of said brake disc relative to said wheel section.

2. A brake system according to claim 1 including means to retain said meshed teeth relationship between said brake disc and said housing under preselected pressure.

3. A brake system for a vehicle, comprising:

a central, non-rotatable housing supported to and forming a part of a vehicle;

an outer rotatable wheel section, including an outer hub and wheel rim, rotatably supported to said housing and rotatable about a wheel axis;

an annular brake disc having an annular axis and having a plurality of spaced apart integral tang portions extending radially outwardly therefrom;

caliper means supported to said non-rotatable housing having means to contact said annular brake disc;

first teeth forming means with each of said brake disc tang portions, the teeth extending in planes radial of said brake disc annular axis; and second teeth forming means secured to said wheel section corresponding in number to and spaced in register and meshing with said teeth forming means with said brake disc tang portions, said first and second teeth forming means having spaced apart teeth extending in planes radial of said wheel axis and providing means for non-rotatably securing said brake disc to said wheel section in a plane perpendicular to said wheel axis and permitting free radial expansion and minimal rotational displacement of said brake disc relative to said wheel section.

4. A brake system according to claim 3 wherein said annular brake disc has opposed sides in radial planes and has a plurality of spaced apart integral tang portions extending radially outwardly therefrom and wherein each of said tang portions has a recess formed in one side thereof and wherein said first teeth forming means includes a rack insert having said teeth thereon.

5. A brake system according to claim 4 including:

a cylindrical adapter ring means having a cylindrical axis and being secured to said wheel section whereby the axis of said adapter ring and said wheel section are coincident and having an outer end surface in a plane perpendicular to the cylindrical axis and having a plurality of spaced apart recesses in said outer planar surface equal in number and in register with said recesses in said brake disc tang portins, and wherein said second teeth forming means including a rack insert having teeth thereon, the teeth of said two rack inserts meshing together.

6. A brake system according to claim 3 including means to retain said first and second teeth forming means in contact with each other under preselected pressure.

7. A brake system according to claim 5 including means to retain said first and second teeth forming means in contact with each other under preselected pressure comprising:

a rack retention bar for each of said disc brake tang portions secured to said adapter ring outer end surface by bolt means extending to either side of said tang portion; and spring means between said bolt means and said rack retention bar.

8. A brake system according to claim 7 wherein said spring means is in the form of spring washers positioned between said bolt means and said rack retention bar.

9. A brake system according to claim 7 wherein said spring means is between said rack retention bar and said brake disc tang.

* * * * *